Figure 4:
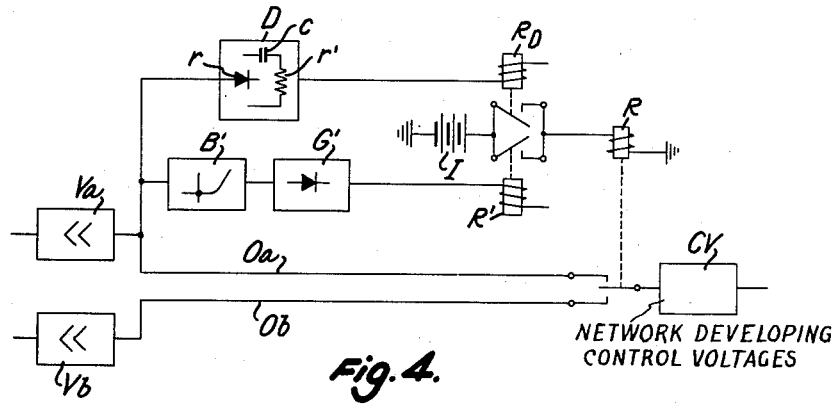

Jan. 10, 1956  G. GUANELLA ET AL  2,730,715
METHOD OF AND APPARATUS FOR GUIDING FLIGHT
BODIES ALONG PRESELECTED FLIGHT PATHS
Filed Nov. 6, 1952  2 Sheets-Sheet 1
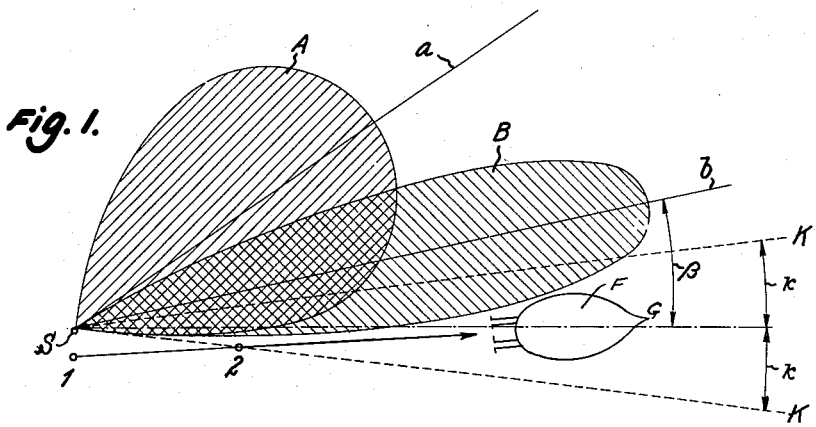
Fig. 1.
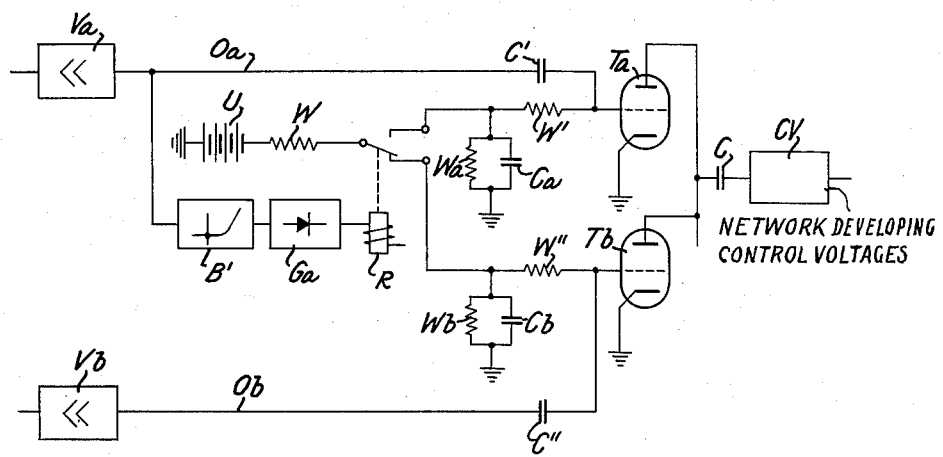
Fig. 2.
Fig. 3.
INVENTORS
Gustav Guanella,
Paul Gittinger,
Max Rattmann,
Georg Weber,
BY
Pierce, Scheffler & Parker,
ATTORNEYS

United States Patent Office 2,730,715
Patented Jan. 10, 1956

2,730,715

METHOD OF AND APPARATUS FOR GUIDING FLIGHT BODIES ALONG PRESELECTED FLIGHT PATHS

Gustav Guanella, Zurich, Paul Güttinger, Wettingen, Max Lattmann, Zurich, and Georg Weber, Kusnacht, near Zurich, Switzerland, assignors to "Patelhold" Patentverwertungs- & Elektro-Holding A.-G., Glarus, Switzerland, and "Contraves" A.-G., Zurich, Switzerland, jointly Application November 6, 1952, Serial No. 319,058

Claims priority, application Switzerland November 15, 1951

20 Claims. (Cl. 343—106)

This invention relates to methods of and apparatus for guiding the travel of a flight body along a desired flight path which is determined by the radiation into space of ultra-high frequency radio waves; the flight body being a rocket, a robot aircraft or a piloted aircraft. In the case of a rocket or robot aircraft, the invention provides an automatic steering of the flight body to travel along the desired flight path and, in the case of a piloted aircraft, the invention provides data as to the instantaneous location of aircraft with respect to the flight path, thereby enabling the pilot to make appropriate adjustments to return the aircraft to the preselected flight path in the event of a departure therefrom.

It is known, for example as described and claimed in United States Patent No. 2,578,241, Gustav Guanella, to provide flight bodies of robot or of piloted type with radio receivers for developing electrical values significant of the departure of a flight body from a preselected flight path which is determined by the radiation from a ground point of a club-shaped beam of ultra-short radio waves which is inclined to and rotated about the desired flight path. The developed electrical values may energize control devices to correct the deviation of an automatically controlled flight body from the desired flight path, or the electrical values may be impressed upon electrical instruments or a cathode ray tube to provide visual indications from which the pilot may determine the deviation of the flight body from the desired flight path. The rotation of a constricted beam of radio waves about the desired guide path as an axis results in a cyclic variation of field strength at points displaced from the rotational axis and, as described in the Guanella patent, amplitude modulated signals are received when the flight body carrying the receiver is displaced from the guide path. The degree of modulation is a measure of the radial deviation of the flight body from the guide path and the phase position of the modulation is a measure of the orientation of the flight body in a vertical plane through the same and transverse to the guide path. The receiver described in the prior patent develops two direct current voltages which vary respectively with the departure and the direction of departure of the flight body from the guide path, and these voltages energize automatic steering apparatus for correcting deviations of the flight body from the desired guide path, or they may be applied to indicating devices to inform a pilot of the instantaneous position of an aircraft with respect to the desired flight path.

The angle between the guide path and the axis of the maximum beam intensity, and also the angular spread of the directional beam, should be small to obtain relatively large changes in the degree of modulation of received signals on small changes in distance of the flight body from the flight path, a condition which must be satisfied to attain a high accuracy in the automatic steering of a flight body. These requirements for high accuracy make it difficult to introduce the flight body into the space swept over by the concentrated directional beam at the start of the flight of the body, and they limit the rate of angular displacement of the transmitter antenna to change the direction of the guide path to a relatively low value since the flight body can not change direction instantaneously to remain within the space swept over by the beam on a rapid change in the direction of the guide path.

Objects of the invention are to provide methods of and apparatus for the steering of flight bodies which avoid the stated disadvantages or limitations of the prior systems. Objects are to provide steering methods and apparatus of the type stated which are characterized by the radiation into space of two club-shaped beams of ultra-high frequency radio waves of different angular spread and rotating about the desired guide path, the angle between the guide path and the axis of maximum beam intensity of the beam of greater angular spread being substantially greater than the corresponding angle for the beam of lesser angular spread, and by the steering of the flight body in response to energy derived from one or the other of the rotating beams in accordance with the degree of modulation of the narrower beam at the instantaneous position of the flight body. An object is to provide steering methods and apparatus as above stated in which the beams of different angular spread rotate about the same or at least approximately the same axis. Other objects are to provide radio receivers to be carried on flight bodies for the reception of guiding or steering signals from two directional beams of different angular spread and rotating about a guide path, the receivers having individual antennae and detectors for the reception of energy from the respective beams, a common output system for developing guiding or steering voltages, and a relay element or elements responsive to the amplitude of the modulation of the energy derived from the beam of greater angular spread, and which is directly related to the degree of modulation of energy received from the beam of lesser angular spread, to control the connection of one and/or both of said individual antennae and detectors to said common output system.

These and other objects and the advantages of the invention will be apparent from the following specification when taken with the accompanying drawings, in which:

Fig. 1 is a schematic diagram illustrating the relative spatial arrangement of two rotational ultra-high frequency radio beams of different angular spread with respect to a guide path, as contemplated by this invention; and Figs. 2 to 5 are schematic diagrams of different embodiments according to the invention of receivers for use on flight bodies which are to be guided or automatically steered along a guide path such as developed by the two-beam system of Fig. 1.

In Fig. 1, the reference character S identifies a point on the ground at which transmitters of known type and not shown are located to radiate into space directional beams of ultra-high frequency energy A and B respectively, and to rotate the beams about the desired guide path SG as an axis. The angular spread of the beam A is substantially greater than the angular spread of the beam B, and the axis $a$ of maximum intensity of the club-shaped beam A is arranged at a substantially greater angle to the desired guide path SG than the axis $b$ of maximum intensity of the narrower club-shaped beam B. So far as is physically possible, the two transmitters are closely arranged for rotation of beams A and B about the guide path SG along which the flight body F is to move away from the transmitters. As shown, the inner edges of the beams A and B substantially coincide with the guide path SG. The region or conical space about the guide path SG within which a flight body may be efficiently and accurately guided by energy derived from the narrow beam B is defined by limit lines SK, SK at angles $k$ to the guide path SG, the angle $k$ being somewhat smaller than the angle $\beta$ between the maximum intensity axis $b$ of the beam B and the guide path SG.

In accordance with the invention, a flight body which is started from or passes over a point 1 adjacent the ground location S of the rotating beam transmitters, and which is travelling in at least the general direction of the flight path SG, is initially steered by energy derived from the rotating beam A of wider angular spread and is not influenced by energy derived from the narrower beam B until the flight body reaches the point 2 at which it enters the limited conical zone defined by lines K, K at angle $k$ to the guide path SG. The two beams of course differ from each other in some manner in order that the receiving apparatus may distinguish between them, for example they may be of different wavelengths and/or they may carry different modulations, preferably modulations of impulse type.

In the embodiment of receiving apparatus which is shown in Fig. 2, individual antennae $Aa$ and $Ab$, demodulators $Da$ and $Db$, and amplifiers $Va$ and $Vb$ are provided for the reception of signal energy from the rotating beams A and B respectively, the amplifiers being of automatic gain control type and so regulated by direct current voltages derived from the demodulators that the amplifier output voltages delivered to the respective amplifier output lines $Oa$ and $Ob$ respectively are alternating voltages of the rotational frequencies of the beams A and B respectively, and vary in magnitude with degree of modulation of the corresponding beam energy at the respective beam antennae $Aa$ and $Ab$. As a matter of convenience, the beams A and B preferably have the same rotational frequency although this is not a rigid design requirement for the Fig. 2 receiving apparatus.

The output lines from amplifiers $Va$ and $Vb$ are connected to the front contact and back contact respectively of a relay R having an armature or movable blade contact constituting an input connection to a network CV, not shown in circuit detail, for developing control voltages for energizing apparatus I/S for indicating the departure of the radio receiver, and the flight body on which it is located, from the desired flight path and/or for actuating steering apparatus for correcting the deviation of the flight body from the desired flight path SG as indicated schematically by the broken lines extending to the horizontal and vertical control surfaces at the rear of the flight body F. The relay R is energized from the output line $Oa$ of the detector-amplifier for beam A through a threshold stage B' and a rectifier $Ga$.

The network CV for developing control voltages and the indicating or steering apparatus I/S may be of the types disclosed in Figs. 6, 8, 9 and 10 of the prior Guanella patent or of other known types as the particular electrical and mechanical constructions of these elements may be varied without departure from the invention.

So long as the degree of modulation of the signal derived from the rotating beam A is above a certain value, which corresponds to an instantaneous location of the flight body at the border of the zone defined by lines SK, SK, the relay R is pulled in by the direct current output of the rectifier $Ga$, and the input to the evaluating apparatus or network CV is derived from the rotating beam A of wider angular spread. When the deviation of the flight body from the desired flight path is reduced by manual or automatic steering, the degree of modulation of the short wave signal impressed upon the antenna $Aa$ is similarly reduced and the relay R drops out when the output voltage of the amplifier $Va$ drops below the value which can pass the threshold stage B. The threshold value of stage B' is so selected that the relay R is de-energized when the flight body is so located within the rotating fields of beams A and B that the degree of modulation of signals developed from beam B are within the minimum value which affords precision and sensitive regulation of the derived indication and/or control voltages. This evaluating or analyzing network CV is thus connected to the output line from the amplifier $Vb$ of beam B when, and only when, the flight body is within the conical zone or region defined by the boundary lines SK, SK which are at a relatively small angle to the desired guide path SG.

If the flight body should move outside of this narrow zone of accurate control of guiding and/or steering for any reason, for example as a result of a too rapid angular adjustment of the beam transmitters to set a new flight path, the relay R is again energized and pulls in to connect the indicating and/or automatic control system to the output lead $Oa$ of the receiver elements for the beam A of wider angular spread.

The receiver system illustrated in Fig. 3 has the advantage that it effects a gradual change from control by one rotating beam to control by the other, thereby avoiding oscillation or instability in the voltage-developing device CV during the change-over step. The individual amplifiers $Va$ and $Vb$ for signal energy from beams A and B respectively, the receiver elements which precede the amplifiers, the threshold stage B', rectifier $Ga$ and the relay R may be substantially as previously described, but the output lines $Oa$ and $Ob$ of the respective amplifiers are connected to the voltage-developing device CV through electron tubes $Ta$ and $Tb$ which are controlled as to conductivity by the relay R. Coupling condensers C' and C" are provided in the lines $Oa$ and $Ob$ to the grids of the respective tubes, and both tubes work into the voltage-developing device through a common coupling condenser C. The control grids of tubes $Ta$ and $Tb$ are returned to their cathodes through grid resistors W' and W", and timing circuits comprising respectively a resistance $Wa$ shunted by a condenser $Ca$, and a resistance $Wb$ shunted by a condenser $Cb$. The cathode ends of the grid resistors of tubes $Ta$ and $Tb$ are connected to the back and the front contacts of relay R, and the blade contact is connected through resistance W to the negative terminal of a source of voltage, such as a battery U, of sufficient magnitude as to block conduction through the tubes.

The method of operation is similar to that of the Fig. 2 embodiment in that the relay R is energized so long as the degree of modulation of the signal derived from beam A is above the value corresponding to a location of the flight body at the border of the zone defined by lines SK, SK of Fig. 1. The blade contact of relay R is thus in engagement with the front relay contact which is connected to the grid of tube $Tb$, and conduction through the tube $Tb$ is blocked. On entry of the flight body into the effective control zone of the beam B, the relay R is de-energized and drops out to connect the blocking voltage source U to the control grid of the tube $Ta$. The tube $Ta$ is not immediately blocked, however, since the charging of the condenser $Ca$ through the resistance W requires a certain time which is determined by the values of the condenser and resistance. Similarly, the tube $Tb$ is not immediately conductive at its full amplification since the condenser $Cb$ was previously charged to the negative voltage of the source V, and this charge must leak off through the resistance $Wb$. The amplification rates of the two tubes are therefore changed in opposite directions and relatively slowly over a preselected interval during which both beams influence the developed control voltages. The two beams must rotate in phase for satisfactory operation, and the two radiating antennae may, for example, be arranged one behind the other on the same axis of rotation.

It is also of advantage to control the change-over from operation on beam A to operation on beam B in accordance with not only the critical current value at which the relay R drops out, which current value corresponds to the degree of modulation of beam B signals which afford a satisfactory operation on beam B, but also with rate of change of current impressed upon the relay R. If, for example, the flight body enters the effective control zone of beam B at a large angle to the desired flight path, it may leave this control zone again in a short time since the flight body can not respond immediately to the corrective adjustments of the steering mechanism. In such cases it is preferable to control the steering from only the wider beam A until such time as the flight body enters the control zone of beam B at a relatively small angle to the desired flight path SG. Operation in this manner is obtained with apparatus as shown in the fragmentary circuit diagram of Fig. 4.

This embodiment of the invention differs from that shown in Fig. 2 in that the relay R which controls the connection of the output lines $Oa$ and $Ob$ of the amplifiers $Va$ and $Vb$ to the device CV for developing the significant control voltages is not energized by a current derived from the amplifier $Va$ but from a current source I under control of relays R' and RD which have front contacts connected in parallel. The relay R' is energized from the amplifier $Va$ through a threshold stage B' and rectifier $Ga$ which may be identical with the corresponding elements of the Fig. 2 circuit. The relay RD is also energized from the amplifier $Va$ through a device D which includes a rectifier $r$ and a differentiating circuit comprising a condenser $c$ and a resistance $r'$. The relay R' drops out when the degree of modulation of the signal energy derived from beam A corresponds to entry of the flight body into the effective control zone of the beam B, but no change-over will be effected if the rate of change of the degree of modulation is so high that the relay RD remains energized.

It is of advantage to include in the apparatus a clockwork or other timing mechanism to delay the change-over to operation on the narrow beam B for a preselected period, thus avoiding a series of unnecessary switchings during the initial stages when the flight body swings back and forth to approach and follow the desired flight path. In the embodiment illustrated in Fig. 5, a C–R or electrical timing circuit is employed to delay the initial switching into operation on the narrow beam B.

Antennae $Aa$, $Ab$ and the associated demodulators $Da$, $Db$ for the reception of beams A and B respectively may be the same as described with respect to Fig. 2. One of the output lines D', D'' of the respective demodulators in connected, as will be described later, to a common amplifier V of automatic gain control type which develops an output voltage of the rotation frequency of the beams A and B, and of a magnitude proportional to the degree of modulation of the signal energy input to the amplifier. An output line O from the amplifier is connected to the device CV for developing control voltages significant of the location of the flight body with respect to the desired flight path. The amplifier also works into a rectifier G' which develops a direct current voltage which varies with the degree of modulation of the amplified signal voltage, and this output voltage is impressed across a voltage divider comprising resistors $W_1$ and $W_2$. The ratio of the value of the resistor $W_2$ to that of $W_1$ plus $W_2$ is somewhat smaller than the ratio of the degrees of modulation of fields established by beams A and B at the boundary SK of the effective control zone of the beam B.

A relay $R_1$ is connected between ground and the moving contact of a reversing contact set 2' of a relay $R_2$, and the associated back and front contacts are connected by leads L', and L'', to the high voltage end and to the partial voltage junction, respectively, of the voltage divider $W_1$—$W_2$. The relay $R_2$ has another set 2'' of reversing contacts for controlling the switching of the individual beam receivers to the common amplifier, the lead D' from demodulator $Da$ being connected to the back contact and the lead D'' from the demodulator $Db$ being connected to the front contact.

The circuit for energizing the relay $R_2$ includes a current source or battery U, the moving blade and back contact of relay $R_1$, and the moving blade and front contact of a further relay $R_3$, one terminal of the battery U and one end of the winding of relay $R_2$ being grounded. The relay $R_3$ is connected across the current source U through a switch $Sw$ and series resistance $W_3$, and the relay is shunted by a condenser $C_3$.

The switch $Sw$ is closed, for example by inertia, at the start of the flight of a body, but the relay does not pull in immediately to close one gap in the energizing circuit of relay $R_2$. The voltage across the relay $R_3$ increases at a relatively slow rate since the condenser $C_3$ must be charged through the resistance $W_3$, and the values of these elements are so selected that the relay $R_3$ pulls in only after a delay during which the flight body can complete any relatively wide initial swings and attain a relatively stable flight condition within or approaching the effective control zone of beam B at a small angle to the desired flight path.

Figure 5:
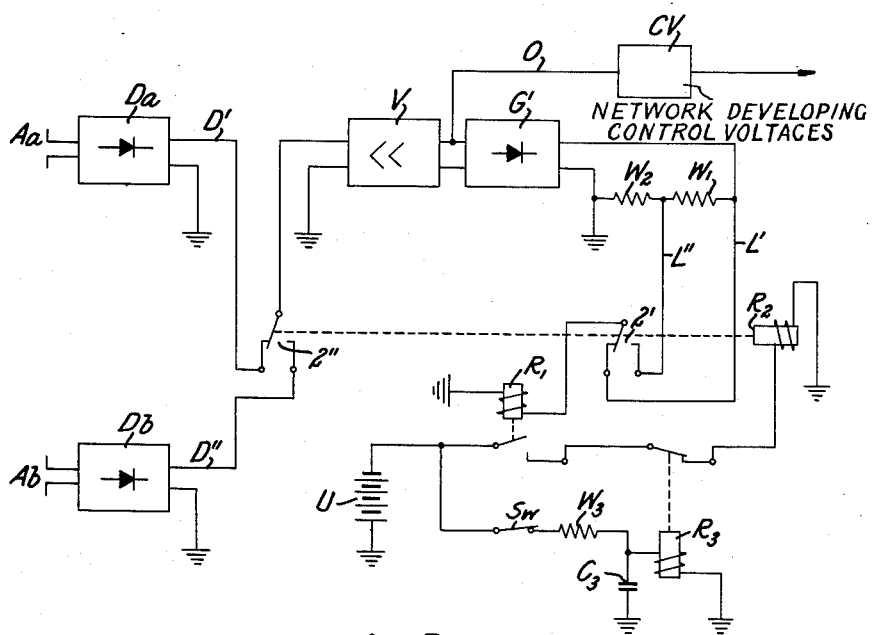

In Fig. 5, the several relays are shown in conditions corresponding to a location of the flight body outside of the control zone of beam B but after the selected delay interval of the timing relay $R_3$. The relay $R_1$ is energized, and the switching relay $R_2$ is therefore de-energized, whereby the amplifier V is connected to the receiver for beam A. The degree of modulation of the energy derived from beam A falls off as the flight body approaches the desired flight path, and the relay $R_1$ drops out when the degree of modulation corresponds to the entrance of the flight body into the effective control zone of the beam B. When this occurs, the relay $R_2$ pulls in to connect the beam B demodulator $Db$ to the amplifier V and to connect relay $R_1$ across only the resistance $W_2$ of the voltage divider. The relay $R_1$ remains in dropout condition, however, although the degree of modulation of beam B at the flight position is greater by a certain factor than the degree of modulation of beam A at that position since the voltage across the relay $R_1$ is reduced by the voltage divider $W_1$—$W_2$ by somewhat more than this factor.

If for any reason the flight body leaves the effective control zone of the beam B, the degree of modulation of the received signal increases and the voltage across the relay increases to the critical value at which the relay $R_1$ pulls in, thus removing current from relay $R_2$ and the latter drops out to connect the amplifier V to the demodulator $Da$. The control of the flight is thus returned to the wider beam A. In this form of the invention the critical control magnitudes are alternately the degrees of modulation of the signals received from the wider beam A and the narrower beam B.

Whereas normally the two short-wave beams rotate about the same guide line or at least about parallel lines, it may be favorable in special cases to make their axes of rotation adjustable in space independently of each other. In this way, for example, flight bodies which start from a spot located at some distance from the transmitter can be brought into the narrower beam with the aid of the independently moved wider beam. In this case, it is advantageous that the steering apparatus be so arranged that a switching back to control by the wider beam cannot occur, after a reversal of the initial conditions to control by the narrower beam has once occurred. In this way one avoids an undesired change in direction of flight bodies already under control of the narrower beam B when the wider beam is swung back for the purpose of bringing in a new flight body. To prevent a switch back to control by beam A, for example in the Fig. 2 circuit, the relay R may be employed to energize a further relay which performs the switching, the further relay having a holding contact which maintains it energized when once operated to transfer the control to the narrow beam B. A simpler arrangement will be to provide the switching relay with a mechanical latch to prevent the switch back to control by the wider beam.

We claim:

1. In the steering of flight bodies along a desired flight path in accordance with the degree of modulation of signal energy received on the flight body, the steps which comprise radiating two beams of ultra-short wave raido energy of individually distinctive character and of different angular spread, rotating the beam of greater angular spread about the desired flight path and with its axis of maximum intensity at a preselected relatively large angle to the flight path, and rotating the beam of lesser angular spread about the desired flight path and with its axis of maximum intensity at a different and relatively small angle to the flight path.

2. In the steering of flight bodies along a desired flight path comprising the axis about which two beams of ultra-short wave radio energy are rotated, the beams being of different angular spread and the axis of maximum intensity of the beam of greater spread being at a greater angle to the flight path than the axis of maximum intensity of the beam of lesser spread; the steps which comprise developing on the flight body from the rotating fields established by the respective beams two alternating current voltages of the rotation frequency and modulated in degrees in accordance with the departure of the flight body from the desired flight path, developing from one or the other of such alternating current voltages control voltages significant of the departure of the flight body from the preselected flight path, and switching from one alternating current voltage to the other as the source from which control voltages are developed in accordance with the degree of modulation of one of said alternating current voltages.

3. In the steering of flight bodies, the invention as recited in claim 1, in combination with the steps which comprise developing on the flight body from the rotating fields established by said beams two alternating current voltages of the rotation frequency and each modulated in degree in accordance with the departure of the flight body from the desired flight path, developing from one of such alternating current voltages a current varying in magnitude with the degree of modulation of that alternating current voltage, and steering the flight body in response to one or the other of such alternating current voltages in accordance with the magnitude of said developed current.

4. In the steering of flight bodies, the invention as recited in claim 1, in combination with the steps of developing on the flight body control voltages from one or the other of said beams in accordance with the magnitude of the degree of modulation of the field established by one of said beams at the momentary position of the flight body.

5. In the steering of flight bodies, the invention as recited in claim 1, in combination with the steps of first steering the flight body by energy derived from the beam of greater angular spread, and steering the flight body by energy derived from the beam of lesser angular spread upon entrance of the flight body into a predetermined zone of the field established by said beam of lesser angular spread.

6. The invention as recited in claim 1, wherein said radiated beams are of different wave lengths.

7. The invention as recited in claim 1, wherein said beams carry different modulations.

8. The invention as recited in claim 1, in combination with the steps of angularly adjusting the axes of rotation of the beams independently of each other, whereby the initial flight path is determined by the axis of rotation of the wider beam and the final flight path is determined by the axis of rotation of the narrower beam.

9. The invention as recited in claim 1, wherein said beams are rotated about a common axis and in phase.

10. In apparatus for steering a flight body along a desired flight path in accordance with the modulation of signal energy received on the flight body, the combination with transmitter means for radiating two club-shaped beams of ultra short radio waves of different characteristics and for rotating said beams about a desired guide path as an axis, said beams being of different angular spread and the axis of maximum intensity of the wider beam being at a greater angle to the guide path than the axis of maximum intensity of the narrower beam; of receiver means to be carried by a flight body, said receiver means including a pair of receiver units selectively responsive to energy received from the respective beams to develop alternating current voltages of beam-rotation frequency and modulated in degree in accordance with the instantaneous position of the receiver means with respect to the guide path, a common means for deriving from a so-developed modulated alternating current voltage control voltages varying with the instantaneous position of the radio receiver with respect to the guide path, and a switching network having one condition of adjustment energizing said common means from the receiver unit for the wider beam and having a second condition of adjustment energizing said common means from the receiver unit for the narrower beam, said adjustments corresponding respectively to a location of said receiver means outside of or alternatively within the effective control zone of the narrower beam; said switching network including means for rectifying one of said modulated alternating current voltages to develop a current varying with the degree of modulation of that voltage, a relay having a winding in the output circuit of said rectifying means and having a set of contacts establishing said first condition of adjustment of said switching network when pulled-in by the current through said winding, said set of relay contacts establishing the second condition of adjustment of said switching network on drop-out of said relay.

11. The invention as recited in claim 10, in combination with means preventing pull-in of said relay after the initial drop-out thereof.

12. The invention as recited in claim 10, in combination with a second relay in said switching network and having a set of contacts in parallel with the set of contacts of said first relay, and means for energizing said second relay in accordance with the rate of change of said rectified current.

13. The invention as recited in claim 10, in combination with timing means preventing an establishment of said second condition of said switching network for a preselected period following the initiation of the flight of a body on which the receiver means is located.

14. The invention as recited in claim 10, in combination with means operative over a preselected interval to progressively effect a change between conditions of adjustment of said switching network upon operation of said relay to initiate a change, whereby said common means is simultaneously energized from both receiver units during said preselected interval.

15. An ultra short wave receiver to be carried on a flight body for steering the same along a desired flight path in accordance with the degree of modulation of signal energy received on the flight body from two club-shaped beams of ultra short radio waves of different characteristics and rotating about an axis constituting the desired flight path, said beams being of different angular spread and the axis of maximum intensity of the wider beam being at a greater angle to the flight path than the axis of maximum intensity of the narrower beam; said receiver including means for developing from energy received from each beam an alternating current voltage modulated in accordance with the location of the flight body with respect to the flight path, means to be energized by one of said voltages to derive therefrom control voltages significant of the position of the flight body with respect to the desired flight path, and a switching network selectively adjustable to impose one or the other of said alternating current voltages upon said voltage-deriving means; said network including means to rectify one of said alternating current voltages, and a relay in the output circuit of said rectifier means for adjusting said network in accordance with the degree of modulation of one of said alternating current voltages.

16. An ultra short wave radio receiver as recited in claim 15, wherein said switching network includes means for simultaneously imposing the same alternating current voltage upon said control voltage developing means and said rectifying means.

17. An ultra short wave radio receiver as recited in claim 15, wherein said rectifying means is energized by the alternating current voltage developed from energy derived from the wider beam, said relay is constructed and arranged to drop out on decrease of the rectified current to a valve corresponding to an entrance of the flight body into the effective control zone of the narrower beam, said relay in drop-out condition adjusting said network to impose upon said control voltage developing means the alternating current voltage developed from energy received from the narrower beam.

18. An ultra short wave radio receiver as recited in claim 17, in combination with timing means for delaying for a preselected interval following the initiation of a flight an adjustment of said network to impose upon the control voltage developing means the alternating current voltage derived from the narrower beam.

19. An ultra short wave receiver to be carried by a flight body for the reception of energy from two beams of club-shaped radiation pattern and different angular spread, the beams revolving about a guide path with the axis of maximum intensity of the wider beam at a greater angle to the guide path than the axis of maximum intensity of the narrower beam; said receiver comprising an individual antenna and demodulator for the reception of energy from the respective beams, a common means for developing from energy derived from either beam control voltages significant of the instantaneous position of the flight body with respect to the guide path, relay means biased to connect said common means to the demodulator for the wider beam, and a rectifier working out of one demodulator to develop a current varying in magnitude with the degree of modulation of the energy output of that demodulator; said relay means being constructed and arranged to connect said common means to the demodulator for the narrower beam on decrease of the rectified current below a preselected value corresponding to entrance of the flight body into the effective control zone of said narrower beam.

20. An ultra short wave receiver to be carried by a flight body for the reception of energy from two beams of club-shaped radiation pattern and different angular spread, the beams revolving about a guide path with the axis of maximum intensity of the wider beam at a greater angle to the guide path than the axis of maximum intensity of the narrower beam; said receiver comprising an individual antenna and demodulator for the reception of energy from the respective beams, a common means for developing from energy derived from either beam control voltages significant of the instantaneous position of the flight body with respect to the guide path, switch means for connecting one or the other of said demodulators to said common means, and means responsive to the degree of modulation of the energy derived from one of said beams for actuating said switch means.

References Cited in the file of this patent

UNITED STATES PATENTS 2,578,241   Guanella   Dec. 11, 1951